United States Patent Office 2,992,925
Patented July 18, 1961

2,992,925
PROCESS FOR PREPARING A GELLED FOOD PRODUCT AND THE RESULTING PRODUCT
Julius Green, New City, and Edward J. Schuller, Forest Hills, N.Y., John A. Rickert, Alpine, N.J., and Bert Borders, New Rochelle, N.Y., assignors to General Foods Corporation, White Plains, N.Y., a corporation of Delaware
No Drawing. Filed Jan. 30, 1959, Ser. No. 790,046
21 Claims. (Cl. 99—131)

This invention relates to new multi-phased food products having a thermostable polymeric carbohydrate base and having incorporated therein comminuted, granulated or powdered foods such as plant or animal foods used for human consumption and to the process for preparing such food products. More particularly, the invention relates to a new food product which has an attractive appearance and shape, is highly palatable, has a unique texture and has at least two continuous phases.

The preparation of new food products from gelable polymeric carbohydrates like algin and pectin having the desirable qualities of this invention has presented those skilled-in-the-art with problems.

One disadvantage which has characterized certain of these formed products is their tough, rubbery or brittle gel nature which renders them exceedingly difficult to chew. Another disadvantage is that other of these products are not sufficiently gelled, are soft and mushy, and do not offer sufficient resistance to chewing. A highly desirable gelled product would be one which is not overly tough but has sufficient chewiness throughout its entire cross-section to enable one masticating it to derive pleasure therefrom.

In the production of extruded gelled products, the manner in which such polymeric carbohydrate materials like algin and pectin respond to gelling agents creates additional difficulties. Such gel forming materials are quite sensitive to the influence of gelling agents like calcium and other alkaline earth metal ions. However, when gelling any extrudate of substantial cross-section by use of gelling agents in a bath, the gelling agents bring about too rapid an onset of gelation such that the outermost portions of the extrudates are gelled to a different degree than the innermost portions; as a result the foregoing unfavorable product characteristics are manifest.

These difficulties in forming or extruding gelable material and gelling such material are considerably increased when attempting to provide novel multi-phase gelled food products. It would be extremely desirable to provide two or more distinct phases, at least one of which is partially or completely concealed within another phase. At the same time such a multi-phase structure should be free of undesirable gelled textures of the types specified hereinabove. Thus, the various inner and outer phases in their gelled state should not be unduly tough or mushy. Furthermore, to provide the novel appearance offered by creating a plurality of phases these phases should be sufficiently distinct from one another and yet be sufficiently integrated with respect to one another so that the product can be readily sliced, cooked or otherwise handled without separation of the various phases.

It is an object of this invention to provide a food product having a multiplicity of phases derived from a polymeric carbohydrate base and having incorporated therein comminuted, granulated or powdered foods. Another object of the invention is to provide such products with a desirable chewy, non-rubbery, or non-brittle texture so that such products will permit one masticating them to derive substantial pleasure therefrom. Yet another object is to prepare such food products which retain their shape on gentle heating or warming and do not require additional cooking to render them usable by the consumer.

A further object is to prepare such multi-phased food products in a condition where the phases are substantially distinct from one another while being integrated, and where integrated, the phases offering sufficiently different eating quality one from the other as to provide a novel relationship of various food solids one to another.

It has now been discovered that the above objects can be achieved by forming a plurality of phases from one or more sols of a polymeric carbohydrate intermediate gel precursor so that there is an interface between each of said phases, allowing the sols to intermix at the interface of the phases, and thereafter gelling the phases. The gelled phases exhibit little or no syneresis. While it is preferred to employ a polymeric carbohydrate gel precursor which forms an intermediate thermostable gel, any polymeric carbohydrate gel precursor may be employed. Examples of the preferred polymeric carbohydrate gel precursors are materials such as the algins like naturally extracted or chemically or physically degraded algins, the low methoxyl pectins, the carragheens and like polymeric carbohydrates or mixtures thereof. It has further been discovered that the addition of a gel improving agent to the sol of a polymeric carbohydrate gel precursor permits the attainment of gels of superior texture and superior tolerance to further processing prior to storage.

These gel improving agents are hydrophilic colloids discretely distributed throughout the sol and are capable of binding free moisture in the gelled phases whereby the phases have a short-gelled, firm texture and exhibit little or no shrinkage or syneresis of water when the frozen phases are thawed. Examples of these colloids are materials such as gums like gum arabic; hydrolyzed starches such as hydrolyzed potato starch and hydrolyzed corn starch like corn syrup solids; cellulosic materials such as sodium carboxymethyl cellulose; gelatin and like colloids.

To prepare the product of the present invention, a polymeric carbohydrate intermediate gel precursor is dissolved in water. Diced or pureed vegetables such as peas, green beans, spinach, water chestnuts, zucchini, and the like; fruits such as tomatoes, apples, apricots, pears, and the like; meats such as ground beef, pork, chicken, and the like; nuts such as peanuts, walnuts, pecans, and the like; or other foods are mixed with the dispersion and well blended. Although the diced or pureed form is preferred as a matter of convenience, other forms of the food such as the pulverized, chopped, etc., forms may also be used. A sufficient amount of gelling agent and gel retarding agent is added to obtain a controlled rate of gelation which permits the mixture to be handled and extruded before gelation is completed. The mixture during extrusion exists as a semi-gel material. At least two batches of the polymeric carbohydrate intermediate gel precursor each preferably containing a different food dispersed throughout are extruded so that there is at least one interface between two adjacent phases. Such processing of the sols permits a sufficient period of contact time between the two phases prior to completion of gelation and results in a desirable mixing of the phases at the interface so that the gelled extruded product will not separate when sliced. Upon completion of gelation the extruded product is completely gelled and exists as a fully formed gel. If desired, more than two phases may be extruded.

Although any shape or any number of phases may be extruded, it is preferred to extrude a core phase within one or more shell phases, each formed so that the intermixing can take place at the interface of adjoining phases. Thus, it is possible to form a series of concentric phases which retain all of the objects of this invention and in particular do not separate when the gelled phases are sliced. However, as stated hereinbefore any desired shape and any number of phases may be extruded if there is an interface between each of two adjoining phases and sufficient time is permitted for the sols to intermix at such interface prior to completion of gelation.

It is preferred to use an interior extrusion nozzle contained within the exterior extrusion nozzle when producing the multi-phased product having concentric phases. The exterior extrusion nozzle is provided so as to protrude beyond the interior extrusion nozzle so that the inner core phase is extruded into the outer shell phase and thereby permitting a sufficient interval for the desired mixing at the interface of the two gel phases prior to extrusion out of the open end of the exterior extrusion nozzle.

An intermediate thermostable gel as used in this invention is a gel which is no longer a semi-gel like substance but has not gelled sufficiently to be a fully formed gel and will not reverse into a sol at temperatures required to heat the food product prior to consumption. By the term "semi-gel" is meant a water solution which forms a transparent, highly viscous, elastic, thixotropic mass, that is, more or less fluid when agitated, but which becomes solid upon standing and which, if broken up will reform upon further standing. It tends to liquefy or disintegrate upon heating; in its semi-solid form it is somewhat difficult to slice as the cut surfaces have a tendency to stick to one another as well as to the slicing device. Slices thereof do not have sufficient strength to retain their original form and cannot be manipulated or handled without collapsing or liquefying because of their thixotropic nature. A semi-gel does not eliminate water without change or collapse of the gel structure. It may be forced through or extruded from a tube in the form of a fine film. By the term "fully formed gel" is meant a firm, rigid but relatively brittle or rubbery gel structure which cannot be forced through or extruded from a small opening or narrow slit as a continuous film. It is broken up by agitation or stirring and will not coalesce and reform upon standing.

When the gel precursor is an algin such as sodium alginate or a low methoxyl pectin then the gelling agent used is an alkaline earth metal salt, the preferred salt in the case of sodium alginate or low methoxyl pectin being a calcium salt which releases the calcium ions slowly by virtue of its low degree of solubility or its low degree of ionization. Since it is desired to have a limited number of calcium ions present at the start of gelation, relatively insoluble or partially ionizable calcium salts such as calcium gluconate, calcium sulfate and like calcium salts are employed. When the gelling agent is a calcium ion such as that obtained from calcium gluconate or calcium sulfate, then the gel retarding agent preferred is tetra sodium pyrophosphate although other phosphates such as trisodium phosphate, sodium hexametaphosphate, sodium tetraphosphate, sodium tripolyphosphate and the like, or calcium complexing agents such as sodium carbonate, sodium oxalate, sodium fluoride, sodium citrate and the like or an organic chelating agent such as phytic acid, the sodium salt of ethylene-diamine-tetra-acetic acid and the like may also be used. The gel retarding agent complexes the calcium ions, and then releases them slowly permitting gelation to take place at a controlled rate. It has been found that when calcium gluconate is employed, it is desirable that the dispersion of gel precursor, gel modifier and divided food form a viscous mass in order to enhance the desirable functions of the calcium gluconate. The controlled gelation permits the semi-gel mixture to be extruded while the gel is being set and at the same time produces a desirable chewy textured product. Although algin and low methoxyl pectin gel precursors will gel in the presence of acid, the gels so formed are undesirable in that they are polymorphous, stringy and discontinuous.

Controlled gelation starts as soon as the gelling agent is added and continues while the semi-gel mixture is being extruded through an orifice into a firming solution so that the extruded mixture retains the shape of the orifice and more rapidly forms a fully formed gel. The use of different shaped orifices permits the attainment of extruded products having unique shapes. When calcium ions are the preferred gelling agent, then the preferred firming solution used is one of a soluble calcium salt. The excess firming solution is drained from the extruded product, and the product may then be consumed immediately by heating to eating temperature or it may be preserved by canning or freezing.

In one embodiment of the present invention a 0.1–10% solution and preferably a 0.5–3% solution of sodium alginate is prepared by dissolving the sodium alginate in water and preferably in hot water at a temperature of at least 150° F. By "solution" is meant the colloidal suspension, dispersion or solution which forms when a polymeric carbohydrate such as an algin is mixed with water. Tetra sodium pyrophosphate is added to the dispersion and then diced or pureed vegetables, fruits, meats, nuts or other foods are mixed with two separate batches of the dispersion. The amount of tetra sodium pyrophosphate added is determined by the gelling agent used. Thus, when the gelling agent is calcium gluconate and it is employed at the preferred levels of 0.4–3.0% by weight of the final product, then 0–0.35% tetra sodium pyrophosphate by weight of the final product is employed.

The mixtures are heated to an elevated temperature and then held for a period of time sufficient to pasteurize the mixture. The semi-gel mixtures are cooled to about 100° F., the calcium gluconate added at a level of 0.4–3.0% by weight of the product and the semi-gel mixtures are immediately extruded through an extrusion device having an exterior nozzle protruding beyond the interior nozzle. The semi-gel mixture is extruded into a firming bath containing a 0.1–5.0% and preferably a 1% calcium chloride solution. Although a firming bath having a calcium chloride concentration of at least 0.01% may be employed, it is preferred to employ a firming bath having a calcium chloride concentration of 0.1–5.0%. Concentrations of less than 0.1% require that the extrudate remain in the firming bath for an excessive period of time before gelation of the extruded product is completed and concentrations over 5% impart an undesirable off-flavor to the product. However, in products where the off-flavor is not undesirable, the concentration of calcium chloride is only dependent upon its maximum solubility in water.

The contact time between the phases in the extrusion tube is less than ten minutes and preferably less than one minute. A contact time of more than ten minutes permits the gel to set firmly so that the semi-gel material is converted into a fully formed gel which cannot be extruded. A contact time of more than one minute permits excessive mixing of the phases at their interface with a loss of individual phase characteristics.

The level of tetra sodium pyrophosphate employed is determined by the amount of and type of gelling agent employed. When calcium sulfate is the gelling agent and it is employed at the preferred levels of 0.33–1.0% by weight of the product, then 0–0.35% tetra sodium pyrophosphate by weight of the product is employed. If more than 0.35% tetra sodium pyrophosphate is employed when calcium sulfate is the gelling agent, then the desirable gel of the present invention is not obtained since the tetra sodium pyrophosphate inhibits the calcium ions to an excessive extent.

In another embodiment of the present invention, a solution of low methoxyl pectin is prepared by dissolving the pectin in water, typically a 0.5-20% solution is prepared. Tetra sodium pyrophosphate is added to the dispersion and then diced or pureed vegetables, fruits, meats, nuts or other foods are mixed with two separate batches of the dispersion. The calcium gluconate is added at a level of 0.1-5.0% by weight of the final product and the mixtures are immediately extruded through an extrusion device having an exterior nozzle protruding beyond the interior nozzle. When calcium gluconate is employed as the gelling agent at a level of 0.1-5.0% by weight of the final product, then the tetra sodium pyrophosphate is employed at a level of 0-0.5% by weight of the final product.

When acid-type foods, such as tomatoes and the like are used, it has been found desirable to add sufficient buffer such as disodium hydrogen phosphate to neutralize the excess acid in such foods. The use of such foods without the addition of buffering materials results in the formation of the undesirable acid-type gel.

When foods such as cheeses having a high proportion of calcium are used, it has been found in the case of the algin product desirable to inhibit the activity of available calcium ions in the cheese by the use of a complexing agent such as sodium citrate.

When spinach is the food used, it is necessary to add an excess of calcium gluconate if an algin or low methoxyl pectin is being used as the gel precursor since the oxalic acid in the spinach ties up considerable amounts of calcium.

The following examples serve as illustrations of several applications of the invention:

EXAMPLE 1

| | Inner phase, percent | Outer phase, percent |
|---|---|---|
| Green beans | | 46.5 |
| Water | 40.1 | 41.4 |
| Onions | | 5.4 |
| Sugar | | 1.6 |
| Oil (cottonseed) | 3.9 | 1.0 |
| Sodium alginate | 3.0 | 2.7 |
| Salt | 1.7 | 0.5 |
| Tetra sodium pyrophosphate (TSPP) | 0.3 | 0.3 |
| Calcium gluconate | 1.0 | 0.6 |
| Mushrooms | 50.0 | |
| | 100.0 | 100.0 |

*Outer shell phase*

The onions were sautéed in the oil and to them were added the beans and water while maintaining the heat. The sodium alginate, salt and TSPP were mixed in hot water and added to the vegetable mixture which was heated to 185° F. and maintained at that temperature for ten minutes. Sugar was then added and the mixture was cooled to 100° F. Dry calcium gluconate powder was added to the cooled mixture and mixed well.

*Inner core phase*

The mushrooms were diced and then sautéed in oil. Spices and water were added to the sautéed mushrooms. The sodium alginate, salt and TSPP were dispersed in hot water and mixed with the sautéed mushrooms. The mixture was heated to 185° F., held at that temperature for ten minutes and cooled to 100° F. Dry calcium gluconate powder was added to the mixture and mixed well.

The two phases were then extruded through an extrusion nozzle so that the inner core phase was extruded into the outer shell phase. The two phases were extruded into a 1% calcium chloride bath, held in the bath for 15 minutes and then drained and washed free of calcium chloride.

EXAMPLE 2

| | Inner phase, percent | Outer phase, percent |
|---|---|---|
| Spinach | | 41.4 |
| Chicken fat | | 9.0 |
| Corn syrup solids (Frodex) | | 5.0 |
| Onions | | 10.0 |
| Water | 32.9 | 26.9 |
| Sodium alginate | 1.6 | 1.9 |
| Tetra sodium pyrophosphate (TSPP) | 0.2 | 0.2 |
| Calcium gluconate | 0.5 | 0.8 |
| Cheese | 33.2 | |
| Water chestnuts | 11.4 | |
| Pimiento | 7.1 | |
| Sodium citrate | 2.0 | |
| Oil (cottonseed) | 8.5 | |
| Spices and flavoring | 2.6 | 4.8 |
| | 100.0 | 100.0 |

*Outer shell phase*

The onions were sautéed in the fat and to them was added the spinach and a small amount of water. The mixture was cooked, the flavor and spice ingredients added and the entire mixture then pureed. The puree and corn syrup solids were mixed with a sodium alginate solution prepared by mixing the sodium alginate and TSPP in hot water. The entire mixture was then heated to 185° F. and maintained at that temperature for ten minutes. The mixture was then cooled to approximately 120° F. and the dry calcium gluconate powder was added to the cooled mixture and mixed well.

*Inner core phase*

The sodium citrate was dissolved in water and to it was added the cheese and oil. The remaining ingredients were then added and blended and mixed with a sodium alginate solution which was prepared by mixing the sodium alginate and TSPP in hot water. The combined mixture was heated to 185° F. and maintained at that temperature for ten minutes. The mixture was then cooled to about 130° F. and the dry calcium gluconate powder was added to the cooled mixture and mixed well.

The two phases were then extruded through an extrusion nozzle so that the inner core phase was extruded into the outer shell phase. The two phases were extruded into a 1% calcium chloride bath, held in the bath for 15 minutes and then drained and washed free of calcium chloride.

EXAMPLE 3

| | Inner phase, percent | Outer phase, percent |
|---|---|---|
| Peas | | 27.7 |
| Green split peas (rehydrated) | | 12.5 |
| Chicken fat | 6.2 | 8.3 |
| Sugar | 4.1 | 3.8 |
| Parsley | | 5.4 |
| Onions | | 2.1 |
| Water | 14.4 | 34.0 |
| Sodium alginate | 26.1 | 1.6 |
| Tetra sodium pyrophosphate (TSPP) | 1.5 | .2 |
| Calcium gluconate | .7 | .4 |
| Carrots | 16.5 | |
| Pimiento | 7.0 | |
| Celery | 10.0 | |
| Water chestnuts | 11.1 | |
| Flavor and spices | 2.2 | 4.0 |
| | 100.0 | 100.0 |

*Outer shell phase*

The onions were sautéed in the fat and the flavor and spices were added while continuing the sautéing. Water and the peas were then added to the sautéed mixture and the ingredients were then pureed. The puree was mixed with the sodium alginate solution which was prepared by mixing the sodium alginate and TSPP in hot water and the parsley added. The mixture was heated to 185° F.

and maintained at that temperature for ten minutes. The sugar was then added and the mixture cooled to about 120° F. The dry calcium gluconate powder was added to the cooled mixture and mixed well.

*Inner core phase*

The onions were sautéed in the fat. The carrots were blanched in boiling water for five minutes and then puréed. The puréed carrots were mixed with the sautéed onions, water chestnuts, pimiento, flavor and spices and mixed with the sodium alginate solution which was prepared by mixing the sodium alginate and TSPP in hot water. The mixture was heated to 185° F. and maintained at that temperature for ten minutes. The celery was then added and the mixture held at 185° F. for an additional two minutes, the sugar then being added and the mixture then cooled to about 100° F. The dry calcium gluconate powder was then added to the cooled mixture and mixed well.

The two phases were then extruded through an extrusion nozzle so that the inner core phase was extruded into the outer shell phase. The two phases were extruded into a 1% calcium chloride bath, held in the bath for 15 minutes and then drained and washed free of calcium chloride.

EXAMPLE 4

|  | Inner phase, percent | Outer phase, percent |
|---|---|---|
| Green peppers |  | 51.20 |
| Onions | 12.34 | 6.40 |
| Chicken fat | 4.10 | 6.40 |
| Sugar | 2.60 | 0.80 |
| Water | 32.90 | 29.70 |
| Sodium alginate | 1.70 | 1.60 |
| Tetra sodium pyrophosphate (TSPP) | 0.20 | 0.20 |
| Calcium gluconate | 0.70 | 0.50 |
| Tomato paste | 22.70 |  |
| Water chestnuts | 12.90 |  |
| Celery | 7.70 |  |
| $Na_2HPO_4$ | .06 |  |
| Flavor and spices | 2.10 | 3.20 |
|  | 100.00 | 100.00 |

*Outer shell phase*

The onions were sautéed lightly in the fat, part of the peppers were then added and the sautéing continued for an additional six minutes after which time the remainder of the peppers were added. The mixture was heated to boiling and pureed. The puree was added to the sodium alginate solution which was prepared by mixing the sodium alginate and TSPP in hot water. The mixture was heated to 185° F. and maintained at that temperature for ten minutes. The sugar was then added and the mixture was then cooled to about 100° F. and the dry calcium gluconate powder was added to the cooled mixture and mixed well.

*Inner core phase*

The onions were sautéed about ten minutes in the fat. The celery was added while continuing to sauté an additional five minutes. The tomato paste, water chestnuts, $Na_2HPO_4$, water, flavor and spices were added and the mixture brought to a boil. To this mixture was added the sodium alginate solution which was prepared by mixing the sodium alginate and TSPP in hot water. The mixture was heated to 185° F. and maintained at that temperature for ten minutes. The sugar was then added and the mixture was then cooled to about 100° F. and the dry calcium gluconate powder was added to the cooled mixture and mixed well.

The two phases were then extruded through an extrusion nozzle so that the inner core phase was extruded into the outer shell phase. The two phases were extruded into a 1% calcium chloride bath, held in the bath for 15 minutes and then drained and washed free of calcium chloride.

In most embodiments of the present invention, as evidenced by the above examples, it is preferred to have a higher available concentration of alkaline earth metal ions such as calcium in the inner phases to obtain the desired textural characteristics in the phases. In some embodiments, however, depending upon the food additives to be incorporated into each of the phases, it is more desirable to employ a higher level of the alkaline earth metal ion such as calcium in the outer phase. Thus, the concentration of alkaline earth metal ion may be varied depending upon the thickness desired in each of the phases, the buffers employed, the calcium complexing agents which may be present in the additives, etc., and combinations of these. Where the level of alkaline earth metal ions such as calcium is higher in the outer phase, products having a more chewy, rubbery surface offering more resistance to mastication are obtained. In this latter connection, any food solids are desirably suspended in a chewy outer phase and typical of these would be spinach and like comminuted greens; in this way, a thermostable short gel form in the outer phases utilizes favorably the properties of rubberiness, but not to an unpalatable extent; desirably, also, a distinctly different eating quality in the inner phase stemming from a different gel strength allows the employment of other food solids which in combination with a stronger gel strength outer phase offer a novel masticating effect; thus, when the inner phase is made of a gel precursor having liquid foods or finely comminuted food solids, a weaker gel structure may be acceptable. On the other hand, a higher concentration of available gelling ions is for the most part employed in the sol producing the inner phase. In this way, a two phase extrudate introduced to a gelling bath, typically of a calcium chloride solution, does not develop an undesirable rubbery, tough, leathery outer skin while the gelling influences are penetrating from the outermost regions of the multi-phase system to the inner regions thereof. In effect, such adjustment of the gelling influences, viz. alkaline earth metal ions, compensates for the different rates of gelling which would otherwise occur when an extrudate of large cross-section is introduced to a gelling bath. On the other hand, it is desirable to have a sufficient concentration of alkaline earth metal ions such as calcium ions present in the gelling bath to rapidly gel the outer surface of the extrudate so that its shape may be retained while gelation is taking place at a slower rate within.

The textures and eating qualities generally obtained are also influenced by the nature and level of the food additives incorporated in the respective phases. For example, additives such as diced celery or diced water chestnuts give a crisp, crunchy texture to the product whereas puréed additives such as purée spinach or green beans give a soft, mushy texture to the product. Thus, it is possible by utilizing various combinations of these food additives to obtain varying textural characteristics depending upon the particular texture which is desired in each of the phases. The extent to which these textural characteristics occur is determined not only by the texture of the additive, but also by the concentration of the additive incorporated within the respective phases. For example, where water chestnuts or diced celery are employed at higher use levels, the phases have a substantially more crisp and crunchy texture than do phases employing lower levels of these additives. For the same reason, phases containing higher levels of puréed spinach or green beans are mushier and softer than are phases containing lower levels of these additives. In many food products, it is preferable to employ a different concentration of food additives in the respective phases in order to offer novel masticating experiences. Thus, in some cases, a higher concentration of food solids is desired in the inner phase than in the outer phase, while in other cases, a higher concentration of food solids in the outer phase than in the inner phase may be desired; this relationship again will be dictated by the nature of the food additive and its state when incorporated into the sols forming the respective phases. This relationship can also apply where it may be desirable to employ a liquid food additive in one phase. In this connection, the phrase "food additive" is intended to embrace liquid and solid foods which foods may range from water soluble materials to water insoluble materials and which include such materials as water soluble flavors, colors, fats, oils, fruits, vegetables, meats, fish, nut meats, cheeses, egg albumin, egg yolk, dried milk solids, and the like; in addition to the above, the phrase "food additive" is intended to embrace materials such as vitamins, minerals, or any other material capable of being consumed by human beings. The food additive may be in any treated state, ranging from a raw, uncooked condition to a partially cooked condition, to a totally cooked condition; here also for many food products, it may be desirable to employ the same food additive in more than one phase but in a different concentration, state, or subdivision and extent of cook.

The products of the present invention, in addition to being preserved by canning or freezing may also be preserved by dehydrating or refrigerating them. Thus, the products can be maintained in storage in a refrigerated, non-refrigerated or frozen form. Furthermore, the multiphase products which are prepared from a thermostable polymeric carbohydrate gel precursor may be gently warmed, boiled, baked, or fried as in deep fat frying prior to serving in order to produce further unique textures.

It will be understood that while the invention has been described in part by means of specific examples, reference should be had to the appended claims for a definition of the scope of the invention.

What is claimed is:

1. A process for preparing an edible food product which comprises forming a plurality of phases of a sol of a polymeric carbohydrate intermediate gel precursor so that there is an interface between each of said phases, allowing said sol to intermix at the interface of said dissimilar phases, and then gelling said phases.

2. A process for preparing an edible food product which comprises forming a sol of a polymeric carbohydrate intermediate gel precursor, forming a plurality of phases from said sol so that there is an interface between each of said phases, incorporating in at least one of said phases prior to formation of said interface a hydrophilic colloidal gel improving agent capable of binding free water in the gel to be produced from said sol, said gel improving agent being discretely distributed throughout said sol, allowing the sols to intermix at the interface of said dissimilar phases, and then gelling said phases.

3. A process for preparing an edible food product which comprises forming a plurality of phases of a sol of a thermostable polymeric carbohydrate intermediate gel precursor so that there is an interface between each of said phases, allowing the sols to intermix at the interface of said dissimilar phases, and then gelling said phases.

4. A process for preparing an edible food product which comprises forming a sol of a thermostable polymeric carbohydrate intermediate gel precursor, forming a plurality of phases from said sol so that there is an interface between each of said phases, incorporating in at least one of said phases prior to formation of said interface a hydrophilic colloidal gel improving agent capable of binding free water in the gel to be produced from said sol, said gel improving agent being discretely distributed throughout said sol, allowing the sols to intermix at the interface of said dissimilar phases, and then gelling said phases.

5. A process for preparing an edible food product which comprises forming a sol of a thermostable polymeric carbohydrate gel precursor, forming a plurality of phases from said sol so that there is an interface between each of said phases, incorporating in at least one of said phases prior to formation of said interface a gelling agent and a gel retarding agent in amounts sufficient to permit a controlled rate of gelation and a divided food, allowing the sols to intermix at the interface of said dissimilar phases, and then gelling said phases.

6. A process for preparing an edible food product which comprises forming a sol of a thermostable polymeric carbohydrate intermediate gel precursor, forming a plurality of dissimilar phases from said sol so that there is at least one interface between each of said phases, incorporating in at least one of said phases prior to formation of said interface a hydrophilic colloidal gel improving agent capable of binding free water in the gel to be produced from said sol, said gel improving agent being discretely distributed throughout said sol, incorporating prior to formation of said interface a different concentration of divided food in each phase and a gelling agent and a gel retarding agent in amounts sufficient to permit a controlled rate of gelation, allowing the sols to intermix at the interface of said phases, and then completing gelation of said phases.

7. A process for preparing an edible food product which comprises forming a sol of a thermostable polymeric carbohydrate intermediate gel precursor, forming a plurality of dissimilar phases from said sol so that there is at least one interface between each of said phases, incorporating in at least one of said phases prior to formation of said interface a hydrophilic colloidal gel improving agent capable of binding free water in the gel to be produced from said sol, said gel improving agent being discretely distributed throughout said sol, incorporating prior to formation of said interface a divided food in greater concentration in the outer phase than in the inner phase and a gelling agent and a gel retarding agent in amounts sufficient to permit a controlled rate of gelation, allowing the sols to intermix at the interface of said phases, and then completing gelation of said phases.

8. A process for preparing an edible food product which comprises forming a sol of a thermostable polymeric carbohydrate intermediate gel precursor, forming a plurality of dissimilar phases from said sol so that there is at least one interface between each of said phases, incorporating in at least one of said phases prior to formation of said interface a hydrophilic colloidal gel improving agent capable of binding free water in the gel to be produced from said sol, said gel improving agent being discretely distributed throughout said sol, incorporating prior to formation of said interface a divided food in greater concentration in the inner phase than in the outer phase and a gelling agent and a gel retarding agent in amounts sufficient to permit a controlled rate of gelation, allowing the sols to intermix at the interface of said phases, and then completing gelation of said phases.

9. The process according to claim 6 wherein the gelling agent is present at a different concentration in each of the phases.

10. The process according to claim 6 wherein the gelling agent is present in a higher concentration by weight of the gel precursor in the inner phase than in the outer phase.

11. The process according to claim 6 wherein the gelling agent is present in a higher concentration by weight of the gel precursor in the outer phase than in the inner phase.

12. A process for preparing an edible food product which comprises forming a sol of a sodium alginate, forming a plurality of phases of said sol so that there is at least one interface between each of said phases, incorporating into at least one of said phases prior to the formation of said interface a hydrophilic colloidal gel improving agent capable of binding free water in the gel to be produced from said sol, said gel improving agent being discretely distributed throughout said sol, incorporating a divided food into said phases prior to formation of said interface, incorporating an alkaline earth metal salt and an alkali metal salt into each of said phases prior to formation of said interface in amounts sufficient to commence a controlled rate of gelation, allowing the sols to intermix at the interface of said dissimilar phases, and then completing gelation of the phases.

13. The process according to claim 12 wherein the alkaline earth metal salt is calcium gluconate and the alkali metal salt is tetra sodium pyrophosphate.

14. The process according to claim 12 wherein the gel improving agent is a hydrolyzed starch and the divided food is divided vegetables.

15. A process for preparing an edible food product which comprises forming a sol of a low methoxyl pectin, forming a plurality of phases of said sol so that there is at least one interface between each of said phases, incorporating into at least one of said phases prior to the formation of said interface a hydrophilic colloidal gel improving agent capable of binding free water in the gel to be produced from said sol, said gel improving agent being discretely distributed throughout said sol, incorporating a divided food into said phases prior to formation of said interface, incorporating an alkaline earth metal salt and an alkali metal salt into each of said phases prior to formation of said interface in amounts sufficient to commence a controlled rate of gelation, allowing the sols to intermix at the interface of said phases, and then completing gelation of the phases.

16. A process for preparing an edible food product which comprises forming a sol of a sodium alginate, adding a hydrolyzed starch to said sol, dividing said sol into two phases, mixing divided green beans into one of said phases of the sodium alginate sol, mixing divided mushrooms into the other of said phases of the sodium alginate sol, adding to each of said phases calcium gluconate and tetra sodium pyrophosphate in amounts sufficient to commence a controlled rate of gelation, forming an inner phase of the mushroom containing phase, forming an outer phase of the green bean containing phase around said inner phase, allowing said sodium alginate sols to intermix at the interface of said phases, and then completing gelation of the phases.

17. An edible food product having at least two continuous dissimilar phases wherein the sols used to prepare such phases are allowed to intermix at the interface between the two phases prior to gelation comprising a polymeric carbohydrate intermediate gel, divided food particles, flavorings and having a non-rubbery, firm texture.

18. An edible food product having at least two continuous dissimilar phases wherein the sols used to prepare such phases are allowed to intermix at the interface between the two phases prior to gelation comprising an algin gel, divided vegetables, a gel improver, flavorings and having a non-rubbery, firm texture which does not exhibit syneresis.

19. An edible food product having at least two continuous dissimilar phases wherein the sols used to prepare such phases are allowed to intermix at the interface between the two phases prior to gelation comprising an algin gel, divided vegetables, hydrolyzed corn starch, flavorings and having a non-rubbery, firm texture which does not exhibit syneresis.

20. An edible food product having at least two continuous dissimilar phases wherein the sols used to prepare such phases are allowed to intermix at the interface between the two phases prior to gelation comprising a low methoxyl pectin gel, divided vegetables, hydrolyzed corn starch, flavorings and having a non-rubbery, firm texture which does not exhibit syneresis.

21. An edible food product having at least two continuous dissimilar phases wherein the sols used to prepare such phases are allowed to intermix at the interface between the two phases prior to gelation comprising an algin gel, divided vegetables and meats, gum arabic, flavorings and having a non-rubbery, firm texture which does not exhibit syneresis.

References Cited in the file of this patent

UNITED STATES PATENTS

| | | |
|---|---|---|
| 2,538,202 | Kimball | Jan. 16, 1951 |
| 2,791,508 | Rivoche | May 7, 1957 |
| 2,879,163 | Anson et al. | Mar. 24, 1959 |

UNITED STATES PATENT OFFICE
CERTIFICATE OF CORRECTION

Patent No. 2,992,925                        July 18, 1961

Julius Green et al.

It is hereby certified that error appears in the above numbered patent requiring correction and that the said Letters Patent should read as corrected below.

Column 1, line 70, the words "Yet another" should appear as the beginning of a paragraph; lines 70 and 71, after "object" insert -- is --; column 3, line 42, for "align" read -- algin --; column 9, lines 38, 46, 56, 64, and 75, and column 10, line 70, before "phases", each occurrence, insert -- dissimilar --; column 9, lines 41 and 42, 53, 60, and 71, column 10, line 6, and column 11, line 7, strike out "dissimilar", each occurrence.

Signed and sealed this 23rd day of January 1962.

(SEAL)
Attest:

ERNEST W. SWIDER                        DAVID L. LADD

Attesting Officer                         Commissioner of Patents